United States Patent
Ramm-Schmidt et al.

[11] Patent Number: 5,775,410
[45] Date of Patent: Jul. 7, 1998

[54] HEAT EXCHANGER

[75] Inventors: Leif Ramm-Schmidt, Kirkkonummi; Hemmo Eriksson, Vantaa; Peter Koistinen, Espoo; Veli Tiainen, Klaukkala, all of Finland

[73] Assignee: Hadwaco Ltd. Oy, Helsinki, Finland

[21] Appl. No.: 809,794

[22] PCT Filed: Sep. 26, 1995

[86] PCT No.: PCT/FI95/00525
§ 371 Date: May 29, 1997
§ 102(e) Date: May 29, 1997

[87] PCT Pub. No.: WO96/09871
PCT Pub. Date: Apr. 4, 1996

[30] Foreign Application Priority Data

Sep. 27, 1994 [FI] Finland ................. 944472

[51] Int. Cl.⁶ ............................................. F28B 1/00
[52] U.S. Cl. .................... 165/110; 165/166; 261/112.2; 261/159
[58] Field of Search .......................... 165/110, 166, 165/111, 112, 113, 180, DIG. 514, DIG. 512, 133, 911, 913; 261/112.1, 112.2, 158, 159, 160

[56] References Cited

U.S. PATENT DOCUMENTS

| 4,162,703 | 7/1979 | Bosaeus . | |
|---|---|---|---|
| 4,263,967 | 4/1981 | McNab et al. | 165/166 |
| 4,411,310 | 10/1983 | Perry et al. | |
| 4,423,772 | 1/1984 | Dahlgren . | |
| 4,515,210 | 5/1985 | Smith et al. | 165/180 X |
| 4,585,523 | 4/1986 | Giddings | 165/133 X |
| 4,771,826 | 9/1988 | Grehier et al. | 165/166 |
| 5,062,927 | 11/1991 | Stout | 165/110 X |
| 5,205,351 | 4/1993 | Muller et al. | 165/110 |
| 5,529,120 | 6/1996 | Howard et al. | 165/166 |

FOREIGN PATENT DOCUMENTS

| 73518 | 10/1987 | Finland . |
| 66 208 | 6/1956 | France . |
| 2 024 653 | 1/1980 | United Kingdom . |
| WO 91/04451 | 4/1991 | WIPO . |
| WO 92/10264 | 6/1992 | WIPO . |

*Primary Examiner*—Denise L. Ferensic
*Assistant Examiner*—Christopher Atkinson
*Attorney, Agent, or Firm*—Burns, Doane, Swecker & Mathis, L.L.P.

[57] ABSTRACT

The invention relates to a heat exchanger wherein the heating vapor is fed onto heat exchange surfaces of membrane material from a vapor distributor, the vapor distributor having parallel conduits for directing vapor over the entire width of the surfaces. According to the invention the vapor distributor is made up of two opposing wall elements which are fastened to each other by means of projections in one element and corresponding recesses in the other element. The upper end of the membrane constituting the heat exchange surface is locked between the projections and recesses that are fastened to each other. Thus, pleats are produced in the membrane as an expansion leeway for the vapor space delimited by the membrane. The heat exchange surfaces may be formed into bags, the ends of which are fastened between the interlinked wall elements in such a manner that the vapor conduits delimited by the elements will direct heating vapor to the inside of the bags and the liquid conduits will direct liquid to be evaporated onto the outer surfaces of the bags.

9 Claims, 2 Drawing Sheets

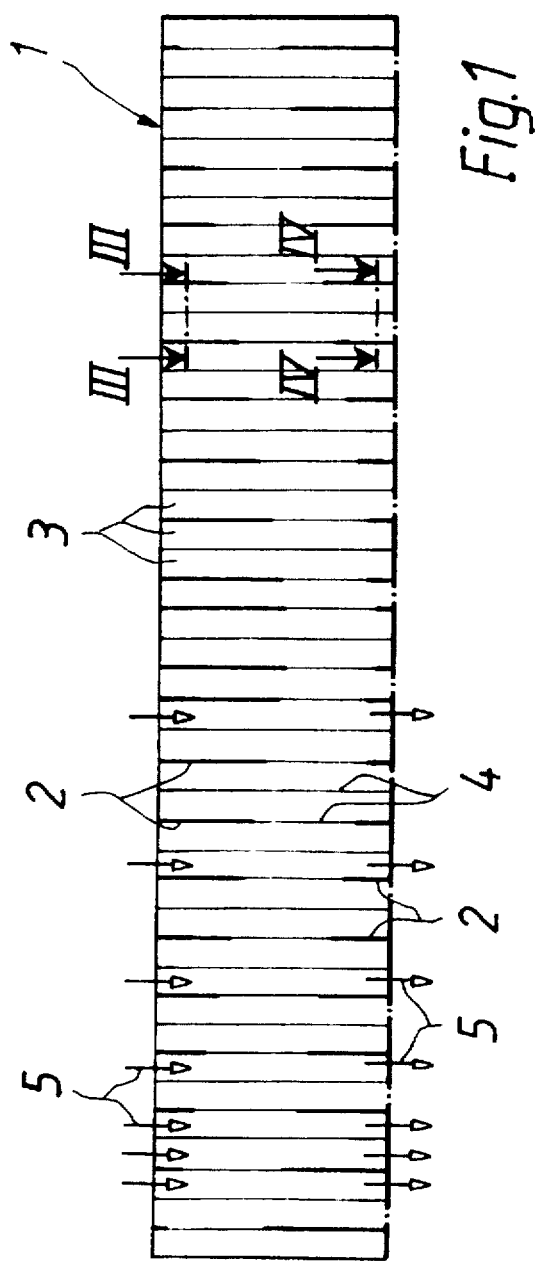
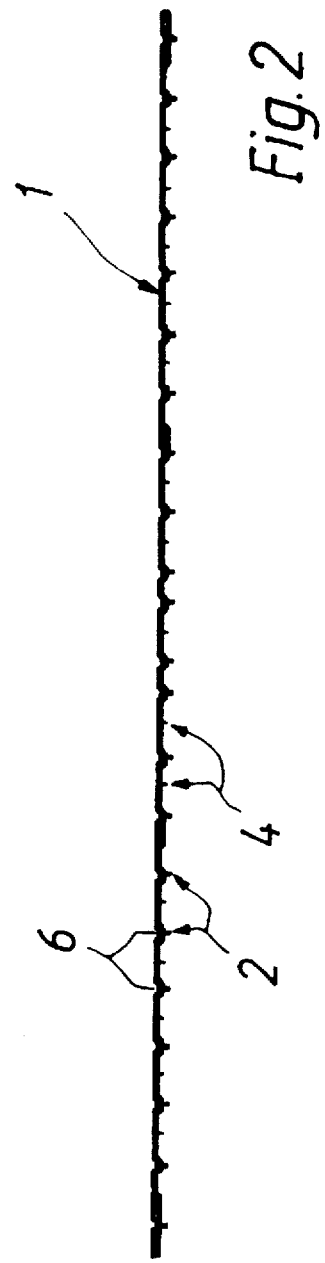

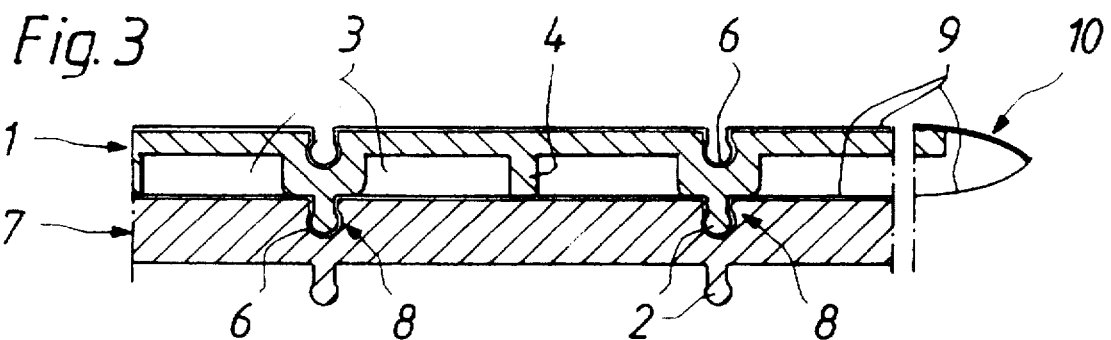
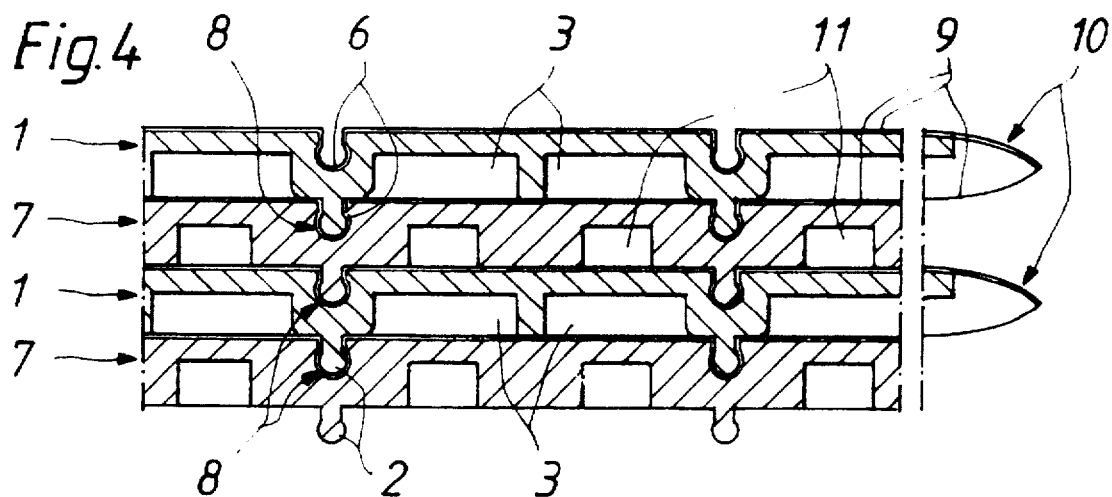
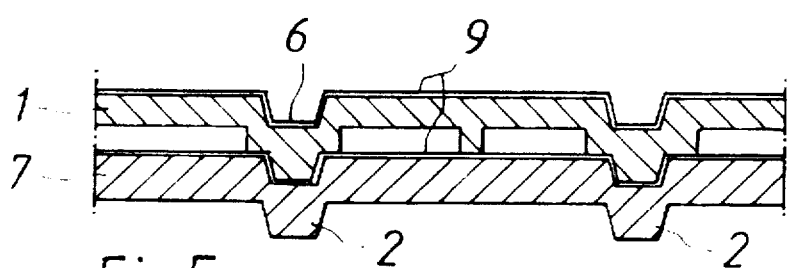
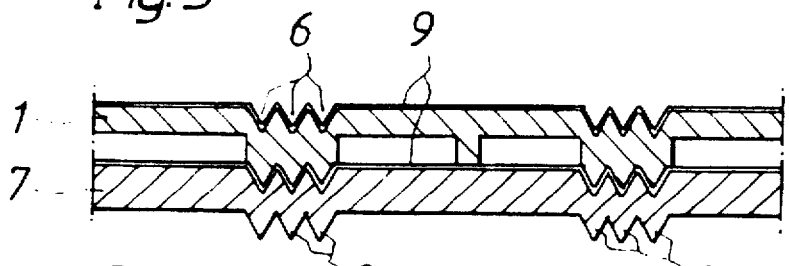

HEAT EXCHANGER

TECHNICAL FIELD

The present invention relates to a heat exchanger wherein the heating vapor is fed onto heat exchange surfaces of membrane material from a vapor distributor disposed at the end of the heat exchange surfaces, the distributor having parallel conduits for directing vapor over the entire width of the heat exchange surfaces.

BACKGROUND OF THE INVENTION

Heat exchangers in which the heat exchange surfaces are of membrane material, such as plastic membrane, are used for the evaporation of liquids by means of vapor serving as a heating medium. For example, FI lay-open print 86961 describes a heat exchanger comprising bags of plastic membrane, the heat exchanger being intended for the distilling of seawater or for the concentrating of various solutions and suspensions. In order for the heat exchange to be effective, the liquid must be distributed evenly over the heat exchange surfaces of plastic membrane, to cover the surfaces throughout, and respectively the heating vapor must be fed evenly onto those plastic membrane surfaces which are opposite with respect to the liquid.

In the heat exchanger according to FI publication 86961, each of the bags of plastic membrane is equipped with a honeycomb structure including liquid and vapor conduits, the honeycomb structure being made up of three honeycombed plates, successively one on top of another, made up of two side walls and of partition walls separating adjacent conduits from each other between the side walls. The conduits in the middle honeycombed plate serve as vapor conduits leading to the inside of the bag, and the conduits in the outer honeycombed plates serve as liquid conduits leading to the outer surfaces of the bag. The bags and honeycomb structures are fastened to each other so that each bag with its honeycomb structure constitutes in the heat exchanger one integral, replaceable heat exchange element.

SUMMARY OF THE PRESENT INVENTION

It is an object of the present invention to provide a heat exchanger in which the vapor distribution conduit system is implemented in a manner simpler than those of the prior art. It is characteristic of the invention that the vapor distributor is made up of two opposite wall elements which are fastened to each other by means of projections in one element and corresponding recesses in the other element, and that the membrane which constitutes the heat exchange surface is locked between the projections and recesses engaging each other.

By the system according to the invention it is accomplished that the fastening projections and recesses fold the membrane which constitutes the heat exchange surface into pleats, thereby narrowing it in the width direction of the heat exchange surface. As the feeding in of heating vapor causes in the heat exchanger an expansion of the vapor space delimited by the membrane, the above-mentioned narrowing of the membrane corresponds to the narrowing which would otherwise follow the expansion of the vapor space. By means of the pleating there is thus produced an expansion leeway in the membrane, thus preventing the membrane from stretching or rupturing in use.

The projections and recesses fastening the wall elements to each other are preferably elongated in such a manner that they channel the passage of vapor between the wall elements. The fastenings may be snap fastenings formed by projections and recesses engaging each other, the fastenings as such sufficing to tie the elements firmly to each other.

The invention can advantageously be applied to evaporators in which the liquid to be evaporated and the heating vapor are fed onto heat exchange surfaces formed by bags of plastic membrane or other similar heat exchange elements, from conduits at their upper end. According to the invention, the wall element delimiting the vapor distributor is in this case arranged to delimit on its other side the liquid conduits required for the liquid to be evaporated, these conduits leading to that side of the heat exchange membrane which is opposite with respect to the liquid. Accordingly, a structure can be formed which is made up of a large number of heat exchange membranes one against another and of a corresponding number of opposite, interlinked wall elements, between which the ends of the heat exchange membranes are locked and which delimit in the spaces between them conduits which serve as distributors for vapor and liquid and which feed vapor and liquid into alternate spaces between the membranes. This system has the advantage over, for example, that disclosed in FI publication 86961 that the number of wall elements separating the conduits is only one half of the number of the side walls between conduits in the structure according to the prior art publication. Owing to the simplified structure, the vapor conduits can be made wider than previously, in which case pressure losses in them will be smaller. This is significant especially in a distiller which uses the vapor obtained from the liquid as heating vapor, in which distiller the temperature difference between the vaporizing liquid and the condensing vapor may be very small.

When bags formed of membrane material are used as heat exchange elements in a heat exchanger, these bags are linked to the wall elements delimiting the vapor and liquid conduits in such a manner that the elements are located alternately on the inside of the bag end and outside the bag. Each wall element inside a bag is in this case a vapor distribution element having projections for forming vapor conduits between the elements, and each wall element outside the bag is a liquid distribution element which is profiled to form liquid channels between the elements.

BRIEF DESCRIPTION OF THE DRAWINGS

The invention is described below in greater detail with the help of examples, with reference to the accompanying drawings, in which FIG. 1 depicts a side view of one wall element of the vapor distributor of a heat exchanger according to the invention, FIG. 2 depicts a top view of the wall element according to FIG. 1, FIG. 3 depicts a portion of a vapor distributor formed by two wall elements, corresponding to section III—III in FIG. 1, FIG. 4 depicts a portion of a vapor and liquid distributor formed by wall elements fastened to each other, corresponding to section IV—IV in FIG. 1, and FIGS. 5 and 6 depict, in a manner corresponding to FIG. 3, alternative methods of fastening the wall elements of the vapor distributor.

DETAILED DESCRIPTION OF THE PREFERRED EMBODIMENTS

The wall element 1 of a vapor distributor of a heat exchanger; shown in FIGS. 1 and 2, is a plate fabricated from plastic by injection molding, the width of the plate corresponding to the width of the heat exchange surfaces of the heat exchanger. The wall element 1 comprises on one side vertical projections 2 by means of which the element can be fastened to another wall element to produce vertical vapor conduits 3 between the elements. Alongside the said projections 2 the wall element 1 has narrower vertical ribs 4 in such a manner that the projections and ribs together divide the space between opposite elements into parallel vapor conduits 3. The travel direction of the heating vapor in conduits 3 is indicated by arrows 5 in FIG. 1. On its opposite side the wall element 1 comprises recesses 6 corresponding in shape to the said projections 2.

The structure of a vapor distributor according to the invention, made up of two opposite wall elements 1, 7, can be seen in FIG. 3. The vapor distributor comprises a vapor distribution element 1, which is a wall element according to FIGS. 1 and 2, and a second wall element 7 which is fastened thereto and which, in accordance with what is described below, constitutes a liquid distribution element. The elements 1, 7 are fastened to each other by snap fastenings 8, in which the projections 2, slightly widened at their ends, belonging to the vapor distribution element, are engaged in recesses 6 of corresponding shape in the liquid distribution element 7. The vapor conduits 3 delimited by the elements are located in the spaces between the fastening lines 8 formed by the projections 2 and recesses 6 and the vapor distribution element ribs 4 which are disposed freely against the wall of the liquid distribution element.

The heat exchange membranes 9 of the heat exchanger, which are of flexible plastic membrane, are in accordance with FIG. 3 formed into a bag 10, one vertical side of which is shown in the drawing, on the side of the heat exchanger. The vapor distribution element 1 is located inside the upper end of the bag 10 and the liquid distribution element 7 on its outside. The vapor conduits thus direct heating vapor to the inside of the bag 10. Between the elements 1, 7 the membrane 9 is locked between the element projections 2 and recesses 6 engaging each other, whereby pleats corresponding to the projections are produced in the membrane to serve as expansion leeway for the pressurization of the bags 10 with vapor.

FIG. 4, which depicts two element pairs 1, 7 according to FIG. 3 fastened to each other, illustrates the structure of the combined vapor and liquid distributor formed from alternate vapor distribution elements 1 and liquid distribution elements 7 fastened one to another. The elements are fastened to each other by means of snap fastenings 8 according to FIG. 3, formed by projections 2 and corresponding recesses 6. Between two elements fastened to each other there is in each given case a plastic membrane locked in place by the projections 2 and recesses 6, and each vapor distribution element is inside a bag 10 formed from membranes and each liquid distribution element 7 is outside a bag. The number of elements 1, 7 and bags 10, fastened one to another according to FIG. 4, depends on the required capacity of the heat exchanger, and it is not limited in the invention.

The liquid conduits 11, seen in FIG. 4 between the liquid distribution element 7 and the vapor distribution element 1 fastened thereto via recesses 6, are formed from recesses molded in the plastic liquid distribution element in connection with its injection molding. The purpose of the liquid conduits 11 is to divide the liquid to be distributed substantially evenly onto the outer surfaces of the bags 10 of plastic membrane. In each liquid distribution element 7 the liquid conduits 11 comprise feed conduits leading from the element ends on the sides of the heat exchanger obliquely downwards to the middle of the element and distribution conduits, shown in FIG. 4, leading from the feed conduits vertically downwards. The location of the feed conduits is shown in FIG. 1 as discontinuations in the vertical projections 2, in which discontinuations a lower and narrower rib 4 connects the sections of the projection to each other in order to separate adjacent vapor conduits 3 from each other. By discontinuing the projections 2 in the area of the feed conduit, it is possible to make the liquid distribution element thinner without the necessity of sacrificing the firm fastening between the elements.

The alternative fastenings for the element pair 1,7 shown in FIGS. 5 and 6 comprise projections 2 shaped in different ways and recesses 6 corresponding to them, which fold the plastic membrane 9 between the elements into pleats which provide an expansion leeway. In these cases the projections 2 and the recesses 6 are not self-locking; the elements 1, 7 must additionally be tied to each other by gluing, welding or by using a separate clamping means or the like.

The described heat exchanger may serve as a distiller in which liquid directed via the liquid conduits 11 onto the outer surfaces of the bags 10 of plastic membrane is vaporized, directed to a compressor, and thereafter, having been compressed to a higher temperature and pressure, is directed back to the heat exchanger via the vapor conduits 3 as heating vapor to be fed to the inside of the bags, the vapor condensing to liquid in the heat exchange process. However, it is possible to use as the heating vapor also vapor produced in some other manner.

For an expert in the art it is clear that the various embodiments of the invention are not limited to those presented by way of example in the foregoing but may vary within the accompanying claims. In particular, the detailed shape and arrangement of the projections 2 and recesses 6 in the wall elements may vary widely.

We claim:

1. A heat exchanger comprising a heat exchange surface of membrane material and a vapor distributor for feeding a heating vapor onto the heat exchange surface, the vapor distributor having parallel conduits for directing the vapor over the entire width of the heat exchange surface, wherein the vapor distributor includes two opposing wall elements fastened to each other by means of projections in one said wall element and 'corresponding recesses in the other said wall element, and the membrane material which constitutes the heat exchange surface is locked between the fastened projections and recesses.

2. A heat exchanger according to claim 1, wherein the projections and the recesses are elongated in such a manner that they channel the travel of vapor between the wall elements.

3. A heat exchanger according to claim 1, wherein the wall elements are fastened to each other by snap fastenings formed by said interlocking projections and recesses.

4. A heat exchanger according to claim 1, wherein said vapor distributor further includes conduits for directing liquid, a first said wall element of the vapor distributor delimits on one side thereof said liquid conduits from which heat-receiving liquid is fed onto a side of the heat exchange membrane material which is opposite to a side of the membrane material over which vapor is directed.

5. A heat exchanger according to claim 4, further comprising a plurality of heat exchange membrane materials disposed one against another and a plurality of opposite, interlinked wall elements between which the ends of the heat exchange membrane materials are locked and which delimit between them said vapor and liquid conduits serving as vapor and liquid distributors, the conduits directing vapor and liquid into alternate spaces between the membrane materials.

6. A heat exchanger according to claim 5, wherein the heat exchange membrane materials are formed into bags which are linked to the opposite wall elements in such a manner that the wall elements are located alternately on the inside of the bag end and outside the bag.

7. A heat exchanger according to claim 6, wherein each wall element inside of the bag is a vapor distribution element having projections for forming vapor conduits between the elements, and each wall element outside the bag is a liquid distribution element which is profiled so as to form liquid conduits between the elements.

8. A heat exchanger according to claim 1, wherein the wall elements are made from plastic by injection molding.

9. A heat exchanger according to claim 1, wherein said heat exchanger is a distillers, the heating vapor is made up of a vapor obtained from a liquid being heated and circulated via a compressor, and the vapor recondensing to liquid in the heat exchange process.

* * * * *